(No Model.)
E. S. ANDERSON.
SPOKE EXTRACTOR.
No. 535,935. Patented Mar. 19, 1895.
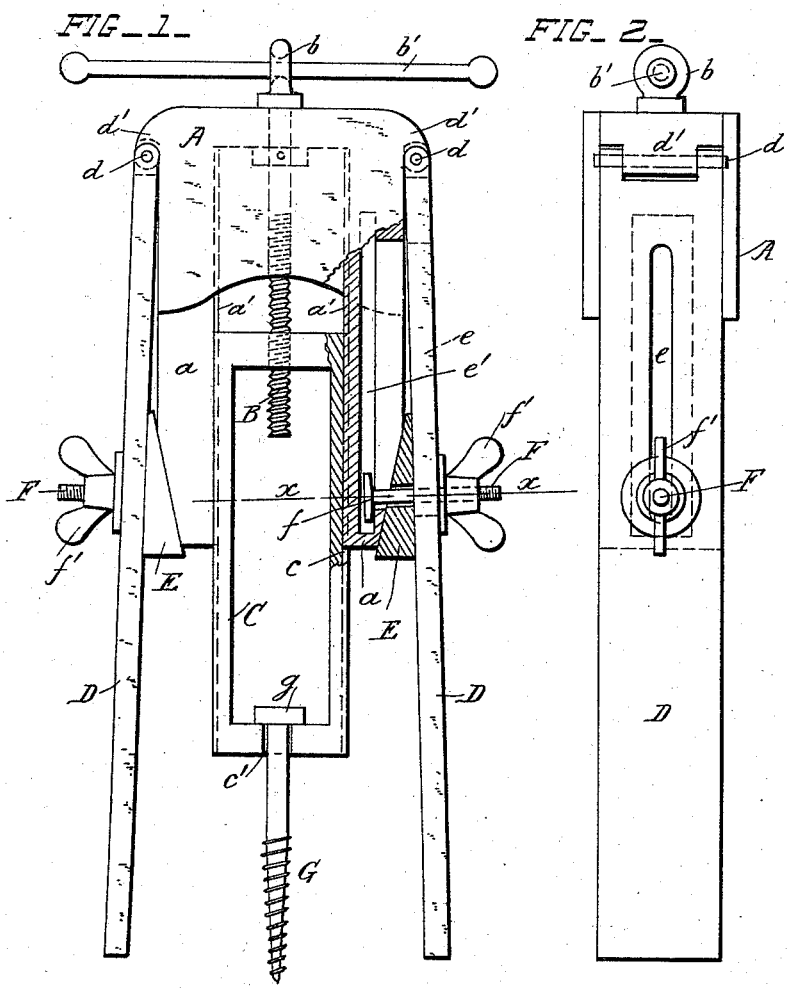
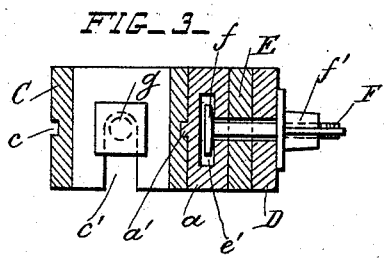
Witnesses
J. Snagg Poole
W. H. Romaville
Inventor
Edmond S. Anderson.
By his Attorney
Herbert W. T. Jenner.

UNITED STATES PATENT OFFICE.

EDMOND S. ANDERSON, OF RHINELANDER, WISCONSIN.

SPOKE-EXTRACTOR.

SPECIFICATION forming part of Letters Patent No. 535,935, dated March 19, 1895.

Application filed December 10, 1894. Serial No. 531,379. (No model.)

*To all whom it may concern:*

Be it known that I, EDMOND S. ANDERSON, a citizen of the United States, residing at Rhinelander, in the county of Oneida and State of Wisconsin, have invented certain new and useful Improvements in Spoke-Extractors; and I do hereby declare the following to be a full, clear, and exact description of the invention, such as will enable others skilled in the art to which it appertains to make and use the same.

This invention relates to wheelwright machines; and it consists of a device for extracting the ends of broken spokes from the hubs of wheels as hereinafter fully described and claimed.

In the drawings: Figure 1 is a front view of the extractor partly in section. Fig. 2 is a side view of the same. Fig. 3 is a cross-section taken on the line $xx$ in Fig. 1.

A is the body portion of the spoke extractor, provided with parallel guides $a$ having ribs $a'$ on their inner faces. B is a screw journaled in the said body A, and provided with an eye $b$ and a bar $b'$ passed through the eye and affording a means for revolving the screw.

C is a slide arranged between the guides $a$ and provided with grooves $c$ engaging with the ribs $a'$.

The screw B engages with one end of the slide C, and $c'$ is a slot formed in the other end of the said slide.

D are arms pivoted by pins $d$ to the lugs $d'$ on the sides of the body portion. The arms D are provided with elongated holes $e$, and the guides $a$ have elongated pockets $e'$ behind the holes $e$ and corresponding with them.

The lower ends of the guides are beveled on their outer surfaces, and E are wedges interposed between the said guides and arms.

F are bolts provided with heads $f$, and thumbnuts $f'$. The heads of the bolts F are arranged to slide in the pockets $e'$ and the bolts pass through holes in the wedges and through the holes $e$ in the arms D.

G is a screw provided with a head $g$. This screw is screwed tightly into the end of a broken spoke, which may be cut off close to the hub if desired. The ends of the arms D are then placed in two mortises of the hub, one on each side of the broken spoke, and the slot $c'$ of the slide is slipped over the screw G as shown in the drawings so as to engage with its head.

The end of the broken spoke is extracted by turning the screw B which draws back the slide C and the screw G.

The arms are adjusted to the mortises of the hub by sliding the bolts F in the holes $e$. The wedges E move with the bolts F and spread the ends of the arms to the required distance apart.

When the spokes, or their ends, have not been removed from the mortises on each side of the spoke end to be extracted, the ends of the arms D can be placed against any part of the periphery of the hub, and a longer screw G can be used to engage with the broken spoke to be extracted.

What I claim is—

1. In a spoke extractor, the combination, with the body portion provided with devices for extracting the spoke, of the arms pivoted at one end to the body portion, sliding wedges interposed between the said body portion and arms, and adjustable bolts for holding the said wedges in position, substantially as set forth.

2. In a spoke extractor, the combination, with the body portion provided with ribbed guides, and arms pivotally connected at one end to the body portion; of the slide arranged between the said guides and provided with grooves engaging with the ribs of the guides, and having an open ended slot $c'$ at its lower part; slidable wedges provided with fastening devices and interposed between the said body portion and arms; a screw provided with a head and adapted to be screwed into the broken spoke and slipped laterally into the said slot, and a screw journaled in the body portion and screwed into the upper part of the said slide, substantially as set forth.

In testimony whereof I affix my signature in presence of two witnesses.

EDMOND S. ANDERSON.

Witnesses:
  SAM. J. MILLER,
  JAS. W. MCCORMICK.